(12) United States Patent
Daly

(10) Patent No.: US 10,660,014 B2
(45) Date of Patent: *May 19, 2020

(54) SELECTED RESTRICTION OF WIRELESS COMMUNICATION SERVICES

(71) Applicant: AT&T Mobility II LLC, Atlanta, GA (US)

(72) Inventor: Brian Kevin Daly, Peachtree Corners, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,828

(22) Filed: Nov. 21, 2016

(65) Prior Publication Data
US 2017/0070945 A1 Mar. 9, 2017

Related U.S. Application Data

(63) Continuation of application No. 14/754,036, filed on Jun. 29, 2015, now Pat. No. 9,532,169, which is a
(Continued)

(51) Int. Cl.
| | |
|---|---|
| *H04W 48/00* | (2009.01) |
| *H04W 48/04* | (2009.01) |
| *H04W 4/021* | (2018.01) |
| *H04W 12/08* | (2009.01) |
| *G01S 19/01* | (2010.01) |

(Continued)

(52) U.S. Cl.
CPC .......... *H04W 48/04* (2013.01); *F16B 5/0635* (2013.01); *F16B 5/126* (2013.01); *G01S 19/01* (2013.01); *H04W 4/021* (2013.01); *H04W 4/029* (2018.02); *H04W 8/22* (2013.01); *H04W 12/08* (2013.01); *H04W 48/02* (2013.01); *H04W 48/08* (2013.01);
(Continued)

(58) Field of Classification Search
CPC ..... H04W 48/04; H04W 48/02; H04W 48/08; H04W 4/029; H04W 4/021; H04W 8/22; H04W 12/08; H04W 64/00; F16B 5/0635; F16B 5/126; F16B 2200/50; G01S 19/01; Y10T 403/58
See application file for complete search history.

(56) References Cited

U.S. PATENT DOCUMENTS

| | | |
|---|---|---|
| 6,032,044 A | 2/2000 | Shannon et al. |
| 6,256,503 B1 | 7/2001 | Stephens |
| (Continued) | | |

FOREIGN PATENT DOCUMENTS

JP 2007282208 A * 10/2007 ............ H04M 1/663

*Primary Examiner* — Khai M Nguyen
(74) *Attorney, Agent, or Firm* — BakerHostetler

(57) ABSTRACT

Wireless communications services on a wireless communications device are selectively restricted in accordance with a location of the wireless device and specific permission and/or restrictions assigned to the wireless device while within/at the location. Services can be selectively blocked (denied), selectively modified, or selectively allowed on a wireless device based on lists indicating permissibility for specific services for specific devices at/within specific locations. A location can be a zone of coverage of a cellular tower, micro/pico/Femto cell or wireless access point, a sector of a zone of coverage, a geographic region within a zone of coverage, or any appropriate combination thereof.

18 Claims, 9 Drawing Sheets

Related U.S. Application Data continuation of application No. 14/271,906, filed on May 7, 2014, now Pat. No. 9,219,977, which is a continuation of application No. 12/832,676, filed on Jul. 8, 2010, now Pat. No. 8,744,480.

(51) Int. Cl.

| | | |
|---|---|---|
| *H04W 4/029* | (2018.01) | |
| *F16B 5/06* | (2006.01) | |
| *F16B 5/12* | (2006.01) | |
| *H04W 48/02* | (2009.01) | |
| *H04W 48/08* | (2009.01) | |
| *H04W 8/22* | (2009.01) | |
| *H04W 64/00* | (2009.01) | |

(52) U.S. Cl.
CPC ......... *F16B 2200/50* (2018.08); *H04W 64/00* (2013.01); *Y10T 403/58* (2015.01)

(56) References Cited

U.S. PATENT DOCUMENTS

| | | | |
|---|---|---|---|
| 6,334,052 B1 | 12/2001 | Nordstrand | |
| 6,690,940 B1 | 2/2004 | Brown et al. | |
| 7,263,367 B1 | 8/2007 | Sabot | |
| 7,903,625 B1 | 3/2011 | Srinivas et al. | |
| 8,401,519 B2 | 3/2013 | Wu et al. | |
| 8,437,791 B2 | 5/2013 | Park et al. | |
| 8,463,297 B2 | 6/2013 | Bull et al. | |
| 8,744,480 B2 * | 6/2014 | Daly | H04W 48/04 455/404.1 |
| 9,219,977 B2 * | 12/2015 | Daly | H04W 48/04 |
| 9,532,169 B2 * | 12/2016 | Daly | H04W 48/04 |
| 2003/0148774 A1 | 8/2003 | Naghian et al. | |
| 2006/0223519 A1 | 10/2006 | Yahagi | |
| 2007/0016458 A1 | 1/2007 | Angle et al. | |
| 2007/0030973 A1 | 2/2007 | Mikan | |
| 2007/0167175 A1 | 7/2007 | Wong et al. | |
| 2007/0223424 A1 * | 9/2007 | Su | H04L 63/105 370/335 |
| 2008/0207170 A1 | 8/2008 | Khetawat et al. | |
| 2008/0222707 A1 * | 9/2008 | Pathuri | G06F 21/62 726/4 |
| 2009/0005061 A1 | 1/2009 | Ward et al. | |
| 2009/0061821 A1 | 3/2009 | Chen et al. | |
| 2010/0105373 A1 * | 4/2010 | Kanade | H04W 48/16 455/418 |
| 2010/0159877 A1 | 6/2010 | Salkini et al. | |
| 2010/0227589 A1 * | 9/2010 | Cook | H04M 1/72572 455/411 |
| 2011/0004893 A1 * | 1/2011 | Borislow | H04N 7/165 725/25 |
| 2011/0059688 A1 | 3/2011 | Noonan et al. | |
| 2011/0093913 A1 | 4/2011 | Wohlert et al. | |
| 2011/0117881 A1 | 5/2011 | Luoma et al. | |
| 2011/0151863 A1 | 6/2011 | Shaw et al. | |
| 2014/0243024 A1 | 8/2014 | Daly | |

* cited by examiner

SELECTED RESTRICTION OF WIRELESS COMMUNICATION SERVICES

CROSS REFERENCE TO RELATED APPLICATIONS

The instant application is a continuation of, and claims priority to U.S. patent application Ser. No. 14/754,036, filed Jun. 29, 2015, which is a continuation of U.S. patent application Ser. No. 14/271,906, filed May 7, 2014, now U.S. Pat. No. 9,219,977 issued Dec. 22, 2015, which is a continuation of U.S. patent application Ser. No. 12/832,676, filed Jul. 8, 2010, now U.S. Pat. No. 8,744,480 issued Jun. 3, 2014. The contents of each of the above-referenced patent applications and patents are incorporated by reference herein in their entirety.

TECHNICAL FIELD

The technical field generally relates to communications systems and more specifically relates to selected restriction of wireless communications services.

BACKGROUND

At times, it may be desirable to prevent the use of wireless devices (e.g., cell phones). For example, in a police facility, prison, or jail, a law enforcement agency may find it desirable, or necessary, to prevent unauthorized use of wireless devices in order to protect the safety of agency personnel and/or the public. Typically, use of a wireless devices can be prevented by jamming (e.g., rf jammers) signals from the devices or blocking signals (e.g., if absorbing, blocking paint, shielding, etc.) from the devices. However, these techniques do not provide selective prevention of use.

SUMMARY

The permissibility of wireless communications services on a wireless communications device is determined in accordance with a location of a wireless device and specific permission and/or restrictions assigned to the wireless device while within/at the location. In an example embodiment, services are selectively blocked (denied), modified, or allowed on a wireless device within a geographic region based on lists indicating allowed services and restricted services.

DETAILED DESCRIPTION OF ILLUSTRATIVE EMBODIMENTS

The permissibility of wireless communications services on a wireless communications device is determined in accordance with a location of a wireless device and specific permission and/or restrictions assigned to the wireless device while within/at the location. Permissibility indicates if a service is allowed, denied, or partially allowed for a wireless communications device at or within a location. In an example embodiment, services are selectively blocked (denied), selectively modified, or selectively allowed on a wireless device based on lists indicating permissibility for specific services for specific devices at/within specific locations. A location can be a zone of coverage of a cellular tower, a sector of a zone of coverage, a geographic region within a zone of coverage, a micro cell, a pico cell, a Femto cell, a wireless access point, or any appropriate combination thereof.

Figure 1:
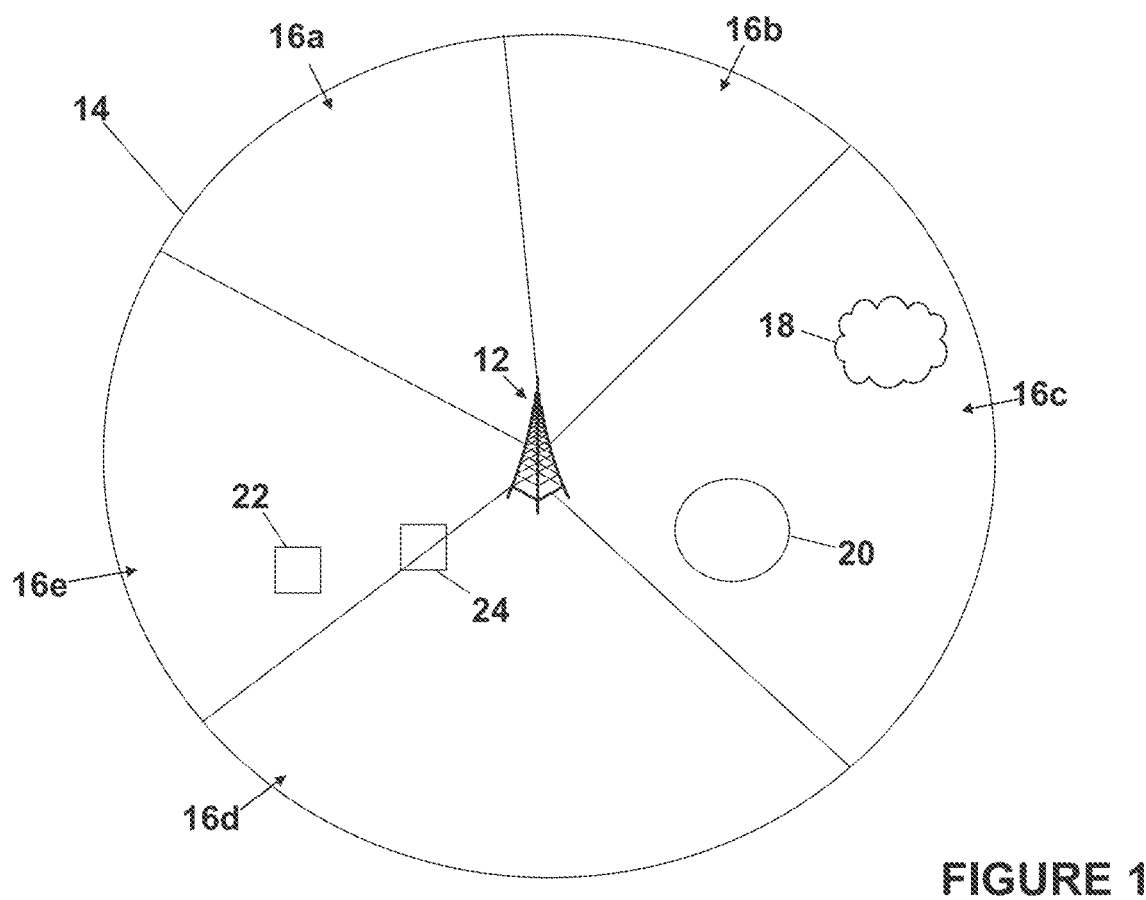
FIG. 1 depicts example locations.

FIG. 1 is an illustration of example locations. In an example embodiment, cellular tower 12 has a zone of coverage 14. FIG. 1 depicts various locations with various shapes, however, it is to be understood that the shapes are for the sake of example only, and no location should be limited to a shape depicted in FIG. 1. The zone of coverage 14 can comprise sectors of coverage. The sectors of coverage are depicted in FIG. 1 as sectors 16*a*, 16*b*, 16*c*, 16*d*, and 16*e*. The number of sectors depicted in FIG. 1 is exemplary. Thus, a zone of coverage can comprise any appropriate number of sectors (including no sectors).

A zone of coverage can comprise one or more regions. As depicted in FIG. 1, the zone of coverage 14 comprises regions 18, 20, 22, and 24. The regions 18 and 20 are within sector 16*c*, the region 22 is within sector 16*e*, and the region 24 is in sectors 16*e* and 16*d*. In an example embodiment, a region comprises a geographic region. For example, a region could be a fixed location, for example, a jail, police station, courthouse, military facility, government facility, or the like. Or, a region could be a moving, dynamically defined, region such as a region associated with an emergency (e.g., terrorist alert, earthquake, tornado), a region associated with a moving vehicle, or the like. A region can be determined via any appropriate means. For example, any of the following techniques, individually or in any combination can be used to determine a region: the location of a cellular site in which a communications device resides, Global Positioning System (GPS), Assisted GPS (A-GPS), triangulation, time difference of arrival (TDOA), direction of arrival, angle of arrival (AOA), time of arrival (TOA), or absolute timing. Zones, sectors, and regions can comprise any shape and any number of dimensions. Thus, zones, sectors, and/or regions can be one-dimensional (e.g., a line), two-dimensional (e.g., area), three-dimensional (e.g., volume), four-dimensional (e.g., time), etc.

In an example embodiment, an authorized agency establishes the permissibilities for wireless communications devices for various locations. An authorized agency can be any appropriate agency authorized to establish permissibility of services. Example authorized agencies can include public safety (police, fire), emergency management, FBI, Secret Service, U.S. Marshals, Correctional Facility management (prison warden, prison guards), or the like.

A permissibility can indicate if a service is allowed, denied, or partially allowed (restricted in part) for a wireless communications device at or within a location. For example, a permissibility can indicate that a service is denied wherein no calls are allowed to be received by a wireless communications device while the wireless communications device is within a specific location. As another example, a permissibility can indicate that a service is allowed by indicating that all calls can be received by a wireless communications device without any restrictions while the wireless communications device is within a specific location. As yet another example, permissibility can indicate that a service is partially allowed (restricting a service in part) by indicating the calls are allowed by a wireless communications device during limited times while the wireless communications device is within a location or to specific numbers only (e.g., 9-1-1). It is to be understood that permissibility of a service should not be limited to the herein described examples, but rather is applicable to any service available to a wireless communications device, and is applicable to any appropriate form of restriction.

In an example embodiment, services are selectively restricted and/or selectively allowed on a wireless device based on lists indicating permissibility for specific services for specific devices at/within specific locations.

Figure 2:
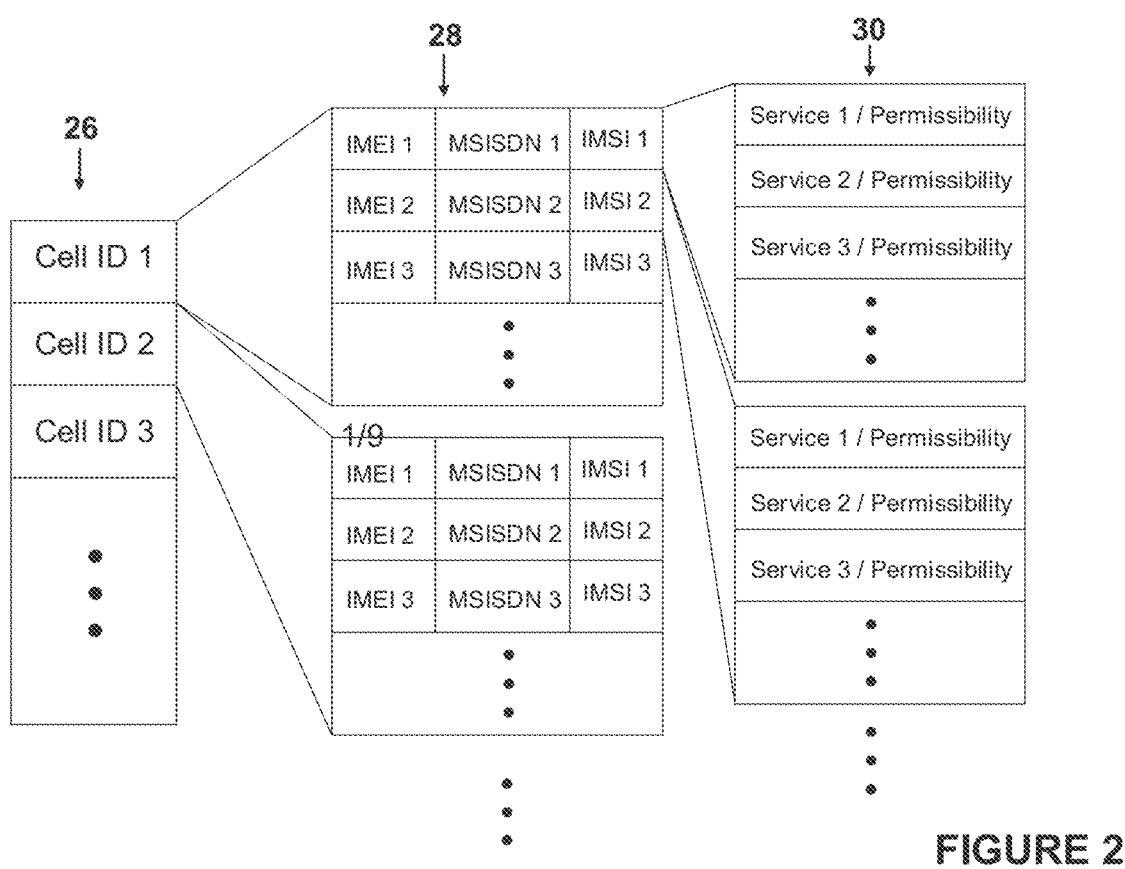
FIG. 2 is a diagram illustrating an example depiction of indicating permissibility of wireless communications services for wireless communications devices at/within specific locations.

FIG. 2 is a diagram illustrating an example depiction of indicating permissibility of wireless communications services for wireless communications devices at/within specific locations. In accordance with FIG. 2 (26), a location can be a zone of coverage by a cellular tower, a sector of a zone of coverage, or any appropriate combination thereof. As depicted in FIG. 2 (26), the location is represented by a cell ID. The cell ID can be any appropriate indication of a cellular tower, a zone of coverage of the cellular tower, a sector of a cellular tower, a zone of coverage of a sector, or any appropriate combination thereof. In an example embodiment, the cell ID comprises an identifier (e.g., a number) used to identify a base transceiver station, a sector of a base transceiver station, or the like. The cell ID can include information as appropriate to provide an indication of a location, such as, for example, a location area code.

Each cell ID can have associated therewith an identification of a wireless communications device. An identification of a wireless communications device can comprise any appropriate identification. For example, as depicted in FIG. 2 (28), the identification of the wireless communications device can comprise an International Mobile Equipment Identity (IMEI) of the wireless communications device, an MSIDN (e.g., Mobile Subscriber Integrated Services Digital Network Number) of the wireless communications device, an International Mobile Subscriber Identity (IMSI) of the wireless communications device, a combination thereof, or the like. An IMEI is a number that identifies a wireless communications device. Typically, the IMEI of a wireless communications device can be found printed inside a battery compartment of the wireless communications device. The MSISDN of a device identifies a subscription of a device in a network. For example, the MSISDN of a device can be the telephone number of the device. Or, more specifically, the MSISDN can be the telephone number of the SIM (Subscriber Identity Module) in the device. The IMSI of a device is a number associated with the device that can be used to determine what network the IMSI belongs to and can be used when the device interconnects with multiple networks.

As depicted in FIG. 2 (30), each wireless communications device at/within a location can have a service, or services, associated therewith having respective permissibilities. Permissibilities can indicate whether a service is allowed without restriction at or within a location, whether a service is denied at or within a location, if a service is restricted in part at or within a location, or a combination thereof. Thus, an authorized agency can establish a mechanism, such as depicted in FIG. 2, to indicate the permissibility of a service for a specific wireless communications device at/within a specific location. If the mobile device information is not contained on a list (28), e.g., the IMEI, IMSI or MSISDN does not match, a default service permissibility may be established.

Figure 3:
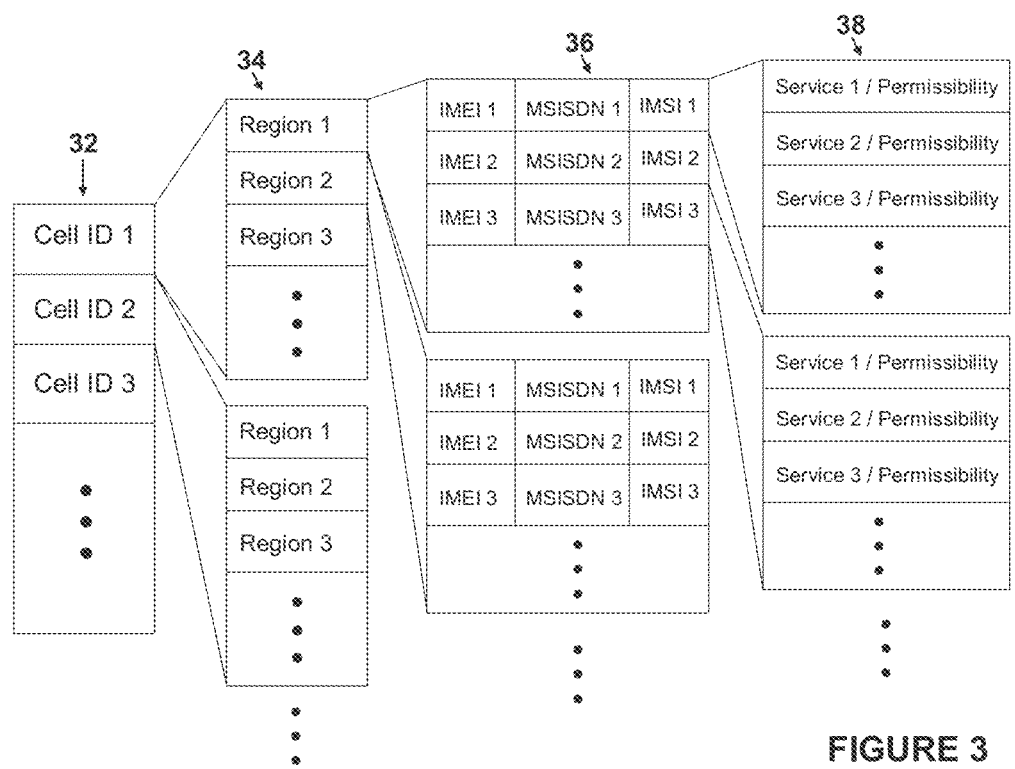
FIG. 3 is a diagram illustrating another example depiction of indicating permissibility of wireless communications services for wireless communications devices at/within regions of specific locations.

FIG. 3 is a diagram illustrating another example depiction of indicating permissibility of wireless communications services for wireless communications devices at/within regions of specific locations. In accordance with FIG. 3 (32), a location can be a zone of coverage by a cellular tower, a sector of a zone of coverage, or any appropriate combination thereof. As depicted in FIG. 3 (32), the location is represented by a cell ID. The cell ID can be any appropriate indication of a cellular tower, a zone of coverage of the cellular tower, a sector of a cellular tower, a zone of coverage of a sector, or any appropriate combination thereof. In an example embodiment, the cell ID comprises an identifier (e.g., a number) used to identify a base transceiver station, a sector of a base transceiver station, or the like. The cell ID can include information as appropriate to provide an indication of a location, such as, for example, a location area code.

As depicted in FIG. 3 (34) a location can be further resolved to a region. As described above, a region can comprise a geographic region define by geographic coordinates or the like. A region can comprise a cellular zone of coverage, a sector, a combination of sectors, a geographic region defined by coordinates, a building, a moving region, or the like. For example, a region could be a fixed location, for example, a jail, police station, courthouse, military facility, government facility, or the like, or, a region could be a moving, dynamically defined, region such as a region associated with an emergency (e.g., terrorist alert, earthquake, tornado), a region associated with a moving vehicle, or the like. A region can be determined via any appropriate means such as, for example, the location of a cellular site in which a wireless communications device resides, GPS, A-GPS, triangulation, time difference of arrival (TDOA), direction of arrival, angle of arrival (AOA), time of arrival (TOA), absolute timing, or any appropriate combination thereof. Although not depicted in the Figures, a region can encompass a zone of coverage. For example, a region could encompass a greater area or volume than a cellular zone of coverage.

Each cell ID can have associated therewith an identification of a wireless communications device. An identification of a wireless communications device can comprise any appropriate identification. For example, as depicted in FIG. 3 (36), the identification of the wireless communications device can comprise an International Mobile Equipment Identity (IMEI) of the wireless communications device, an MSIDN (e.g., Mobile Subscriber Integrated Services Digital Network Number) of the wireless communications device, an International Mobile Subscriber Identity (IMSI) of the wireless communications device, a combination thereof, or the like. An IMEI is a number that identifies a wireless communications device. Typically, the IMEI of a wireless communications device can be found printed inside a battery compartment of the wireless communications device. The MSISDN of a device identifies a subscription of a device in a network. For example, the MSISDN of a device can be the telephone number of the device. Or, more specifically, the MSISDN can be the telephone number of the SIM (Subscriber Identity Module) in the device. The IMSI of a device is a number associated with the device that can be used to determine what network the IMSI belongs to and can be used when the device interconnects with multiple networks.

As depicted in FIG. 3 (38), each wireless communications device at/within a location can have a service, or services, associated therewith having respective permissibilities. Permissibilities can indicate whether a service is allowed without restriction at or within a location, whether a service is denied at or within a location, if a service is restricted in part at or within a location, or a combination thereof. Thus, an authorized agency can establish a mechanism, such as depicted in FIG. 3, to indicate the permissibility of a service for a specific wireless communications device at/within a specific location. If the mobile device information is not contained on a list (38), e.g., the IMEI, IMSI or MSISDN does not match, a default service permissibility may be established.

When a wireless communications device registers with a network, in an example embodiment, signaling information can be sent between the cell site from which the wireless communications device is registering, and the wireless operator's home location register (HLR), or the like. Via the exchange of signaling information, authorization and authentication of the wireless communications device can be accomplished, and permissibility of services can be determined. When the registration signaling information is sent from the cell site/sector (cellular zone of coverage/sector) to the HLR, the HLR receives the cell ID from which the wireless communications device is attempting to access service. If this cell ID is in a "restricted" area (at least one service is restricted, at least in part, at or within the cell zone of coverage/sector), the HLR can perform a further check to determine if the specific wireless device is either on an approved list (in which case authorization will be granted) or a disapproved list (in which case service will be denied, at least in part). As described above, it is possible that a service for all wireless communications devices in a location is restricted, at least in part.

In another example embodiment, when the "registration" signaling information is received by the HLR, the HLR determines that the cell ID is within a "restricted area" and requests the location service platform within the operators network to obtain the specific region of the mobile communications device attempting to access service. As described above, the region information can be GPS, A-GPS, triangulation, time difference of arrival (TDOA), direction of arrival, angle of arrival (AOA), time of arrival (TOA), absolute timing, or any appropriate combination thereof. If the region of the mobile communications device is considered "restricted", the service for the wireless communications device is checked against an approved list and/or disapproved list, in order to determine the permissibility of the service for the wireless communications device at/within the region. Accordingly, the service can be allowed, restricted, or restricted in part for the mobile communications device at/within the region.

Figure 4:
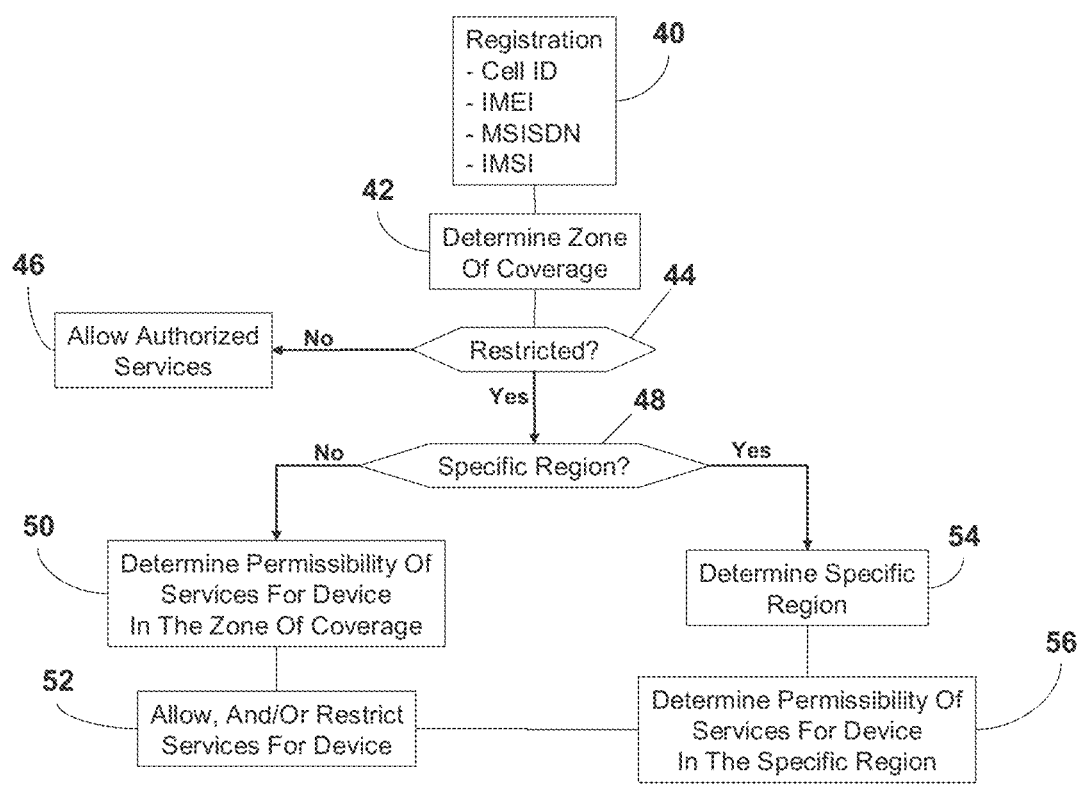
FIG. 4 is a flow diagram of an example process for implementing selected restriction of a wireless communications services.

FIG. 4 is a flow diagram of an example process for implementing selected restriction of a wireless communications services. At step 40, a mobile wireless communications device registers with a network. As described previously, information provided can include a cell ID, an IMEI, an MSISDN, an IMSI, or any appropriate combination thereof. At step 42 a zone of coverage is determined. In various example embodiments, as described above, a zone of coverage can comprise a zone of coverage of a cellular tower, a sector of coverage of a zone of coverage, or any appropriate combination thereof. It is determined, at step 44, if the zone of coverage is restricted. In an example embodiment, at step 44, it is determined if any service is restricted in the zone of coverage, regardless of the specific wireless communications device. In another example embodiment, at step 44, it is determined if a service for the specific wireless communications device is restricted in the zone of coverage. If it is determined, at step 44, that there are not restrictions, the authorized service is allowed at step 46.

If, at step 44, it is determined that a service is restricted, it is determined, at step 48, if a specific region is to be determined. If, at step 44, no specific region is to be determined, the permissibility of the service (or services) for the device at/within the zone of coverage is determined at step 50, and the service (or services) is allowed, restricted, and/or restricted in part accordingly at step 52. If, at step 44, a specific region is to be determined, the specific region in which the wireless communications device is located is determined at step 54. As described a specific region can be determined in accordance with GPS, A-GPS, triangulation, time difference of arrival (TDOA), direction of arrival, angle of arrival (AOA), time of arrival (TOA), absolute timing, or any appropriate combination thereof. The permissibility of the service (or services) is determined at step 56 for the wireless communications device at/within the region, and the service (or services) is allowed, restricted, and/or restricted in part accordingly at step 52.

Figure 5:
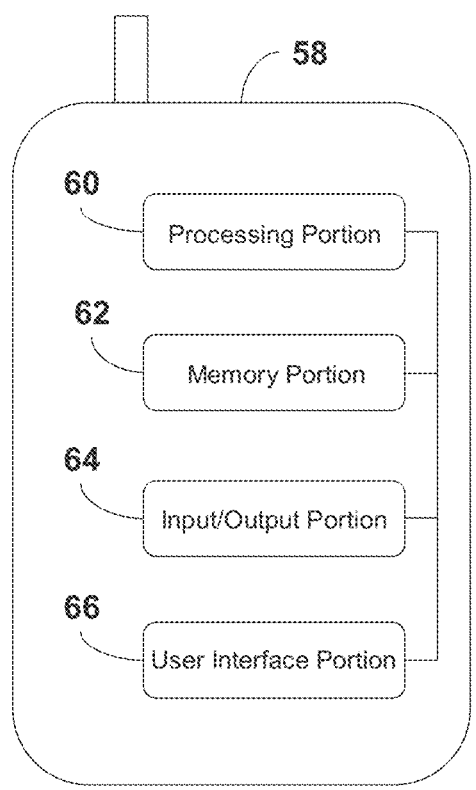
FIG. 5 is a block diagram of an example wireless communications device configured to accommodate selected restrictions of wireless communications services.

FIG. 5 is a block diagram of an example wireless communications device 58 configured to accommodate selected restrictions of wireless communications services. In an example configuration, wireless communications device 58 is a mobile wireless device. The wireless communications device 58 can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The wireless communications device 58 can include devices that are not typically thought of as portable, such as, for example, a public computing device, a navigation device installed in-vehicle, a set top box, or the like. The wireless communications device 58 can include non-conventional computing devices, such as, for example, a kitchen appliance, a motor vehicle control (e.g., steering wheel), etc., or the like. As evident from the herein description, a communications device comprising portions is not to be construed as software per se.

The wireless communications device 58 can include any appropriate device, mechanism, software, and/or hardware to accommodate selected restrictions of wireless communications services as described herein. In an example embodiment, the ability to accommodate selected restrictions of wireless communications services is a feature of the wireless communications device 58 that can be turned on and off. Thus, an owner and/or administrator of the wireless communications device 58, under specific conditions, and under proper authorization can opt-in or opt-out of this capability.

In an example configuration, the wireless communications device 58 comprises a processing portion 60, a memory portion 62, an input/output portion 64, and a user interface (UI) portion 66. It is emphasized that the block diagram depiction of wireless communications device 58 is exemplary and not intended to imply a specific implementation and/or configuration. For example, in an example configuration, the wireless communications device 58 comprises a cellular phone and the processing portion 60 and/or the memory portion 62 are implemented, in part or in total, on a subscriber identity module (SIM) of the mobile wireless communications device 58. The processing function may perform other tasks, for example, such as location determination or the like. In another example configuration, the wireless communications device 58 comprises a laptop computer. The laptop computer can include a SIM, and various portions of the processing portion 60 and/or the memory portion 62 can be implemented on the SIM, on the laptop other than the SIM, or any combination thereof.

The processing portion 60, memory portion 62, input/output portion 64, and UI portion 66 are coupled together to allow communications therebetween. In various embodiments, the input/output portion 64 comprises a receiver of the wireless communications device 58, a transmitter of the wireless communications device 58, or a combination thereof. The input/output portion 64 is capable of receiving and/or providing information pertaining to selected restrictions of wireless communications services as described above. For example, the input/output portion 64 is capable of receiving and/or sending registration information, a cell ID, an IMEI, an MSISDN, an IMSI, information pertaining to a location, information pertaining to a specific region, or the like, or any appropriate combination thereof, as described herein. In an example embodiment, the input/output portion 64 is capable of receiving and/or sending information to determine a location of the wireless communications device 58. In an example configuration, the input\output portion 64 comprises a GPS receiver. In various configurations, the input/output portion 64 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 60 is capable of performing functions pertaining to selected restrictions of wireless communications services as described above. For example, the processing portion 60 is capable of processing registration information, a cell ID, an IMEI, an MSISDN, an IMSI, information pertaining to a location, information pertaining to a specific region, any combination thereof, determining a zone of coverage, determining if a zone of coverage is restricted, determining a specific region, determining if a specific region is restricted, generating an indication of permissibility of a service at/within a location, generating an indication of permissibility of a service at/within a region, generating an indication of permissibility of a service at/within a location for a specific wireless communications device, generating an indication of permissibility of a service at/within a region for a specific wireless communications device, or the like, as described above. In various embodiments, the procession portion 60 is configured to determine a location of the wireless communications device 58.

In a basic configuration, the wireless communications device 58 can include at least one memory portion 62. The memory portion 62 can store any information utilized in conjunction with selected restrictions of wireless communications services as described above. For example, the memory portion 62 is capable of storing information related or pertaining to registration information, a cell ID, an IMEI, an MSISDN, an IMSI, a location, a specific region, permissibility of a service, functionality of a service, or a combination thereof, as described above. Depending upon the exact configuration and type of processor, the memory portion 62 can be volatile (such as some types of RAM), non-volatile (such as ROM, flash memory, etc.), or a combination thereof. The mobile wireless communications device 58 can include additional storage (e.g., removable storage and/or non-removable storage) including, tangible storage media such as tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile wireless communications device 58. A tangible storage medium is a medium having a tangible physical structure.

The wireless communications device 58 also can contain a UI portion 66 allowing a user to communicate with the wireless communications device 58. The UI portion 66 is capable of rendering any information utilized in conjunction with selected restriction of a wireless communications service as described above. For example, the UI portion 66 can render a message, or the like, as described above. The UI portion 66 can provide the ability to control the wireless communications device 58, via, for example, buttons, soft keys, voice actuated controls, a touch screen, movement of the mobile wireless communications device 58, visual cues (e.g., moving a hand in front of a camera on the mobile wireless communications device 58), or the like. The UI portion 66 can provide visual information (e.g., via a display), audio information (e.g., via speaker), mechanically (e.g., via a vibrating mechanism), or a combination thereof. In various configurations, the UI portion 66 can comprise a display, a touch screen, a keyboard, an accelerometer, a motion detector, a speaker, a microphone, a camera, a tilt sensor, or any combination thereof. The UI portion 66 can comprise means for inputting biometric information, such as, for example, fingerprint information, retinal information, voice information, and/or facial characteristic information.

Figure 6:
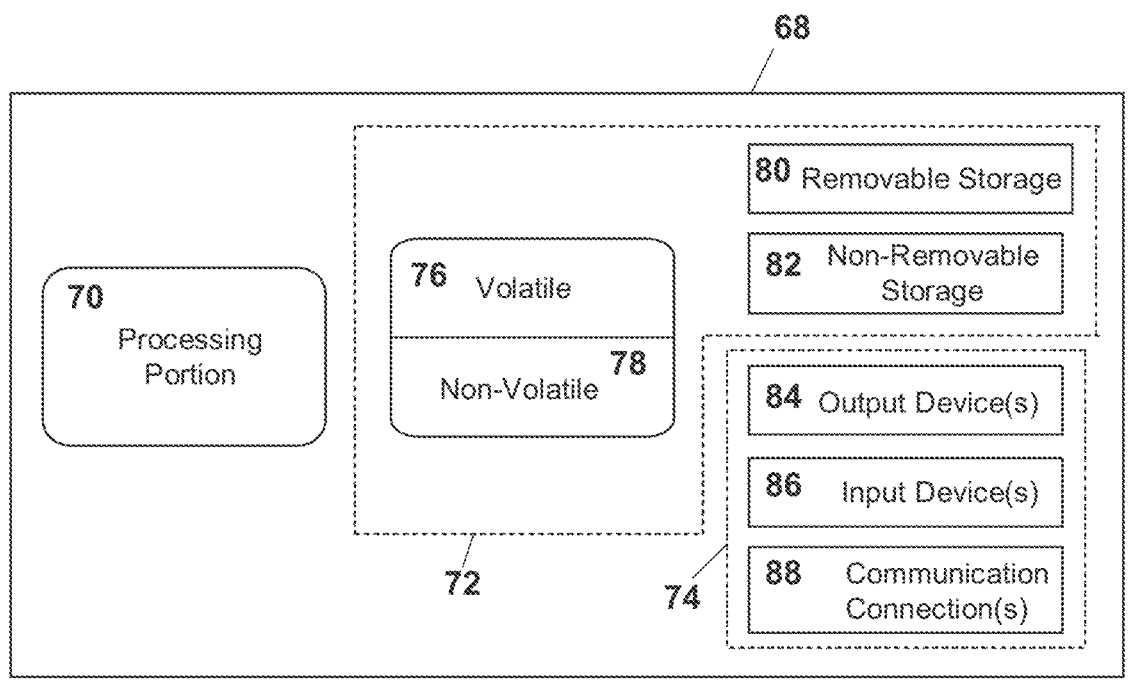
FIG. 6 is a block diagram of an example communications network entity configured to implement selected restrictions of wireless communications services, as described above.

FIG. 6 is a block diagram of an example communications network entity 68 configured to implement selected restrictions of wireless communications services, as described above. The network entity 68 can represent any appropriate device, examples of which include a processor, a computer, a server, a portable computing device, such as a laptop, a personal digital assistant ("PDA"), a portable phone (e.g., a cell phone or the like, a smart phone, a video phone), or any combination thereof. The network entity 68 can represent any appropriate network entity, such as a processor, for example, a server, a gateway, a BSC, a BTS, an access point, an SGSN, a GGSN, a GPRS, an MSC, an SCP, an AuC, an HLR, a DNS, a firewall, a VLR, a GMSC, an EIR, an SMSC, a PPF, a SMPP, an SLF, a location server, an HSS, an AS, an I-CSCF, a P-CSCF, an S-CSCF, an MGCF, an MGW, an IMS, or the like, or any combination thereof.

It is emphasized that the block diagram depicted in FIG. 6 is exemplary and not intended to imply a specific implementation or configuration. Thus, the network entity 68 can be implemented in a single processor or multiple processors (e.g., single server or multiple servers, single gateway or multiple gateways, single network entity or multiple network entities). The network entity 68 can be distributed, centrally located, and/or integrated. Multiple components of the network entity 68 can communicate wirelessly, via hard wire, or a combination thereof.

In an example configuration, the network entity 48 comprises a processing portion 70, a memory portion 72, and an input/output portion 74. The processing portion 70, memory portion 72, and input/output portion 74 are coupled together (coupling not shown in FIG. 6) to allow communications therebetween. The input/output portion 74 is capable of receiving and/or providing information pertaining to selected restrictions of wireless communications services as described above. For example, the input/output portion 64 is capable of receiving and/or sending registration information, a cell ID, an IMEI, an MSISDN, an IMSI, information pertaining to a location, information pertaining to a specific region, or the like, or any appropriate combination thereof, as described herein. In an example embodiment, the input/output portion 74 is capable of receiving and/or sending information to determine a location of the wireless communications device 58. In an example configuration, the input\output portion 74 comprises a GPS receiver. In various configurations, the input/output portion 74 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 70 is capable of performing functions pertaining to selected restrictions of wireless communications services as described above. For example, the processing portion 70 is capable of processing registration information, a cell ID, an IMEI, an MSISDN, an IMSI, information pertaining to a location, information pertaining to a specific region, any combination thereof, determining a zone of coverage, determining if a zone of coverage is restricted, determining a specific region, determining if a specific region is restricted, generating an indication of permissibility of a service at/within a location, generating an indication of permissibility of a service at/within a region, generating an indication of permissibility of a service at/within a location for a specific wireless communications device, generating an indication of permissibility of a service at/within a region for a specific wireless communications device, or the like, as described above. In various embodiments, the procession portion 60 is configured to determine a location of the wireless communications device 58.

In a basic configuration, the network entity 48 can include at least one memory portion 72. The memory portion 72 can store any information utilized in conjunction with selected restrictions of wireless communications services as described above. For example, the memory portion 72 is capable of storing information related or pertaining to registration information, a cell ID, an IMEI, an MSISDN, an IMSI, a location, a specific region, permissibility of a service, functionality of a service, or a combination thereof, as described above. Depending upon the exact configuration and type of processor, the memory portion 72 can be volatile (such as some types of RAM), non-volatile (such as ROM, flash memory, etc.), or a combination thereof. The network entity 68 can include additional storage (e.g., removable storage and/or non-removable storage) including, tangible storage media such as tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 68. A tangible storage medium is a medium having a tangible physical structure.

Depending upon the exact configuration and type of network entity 48, the memory portion 72 can include computer readable storage media that is volatile 76 (such as some types of RAM), non-volatile 78 (such as ROM, flash memory, etc.), or a combination thereof. The network entity 48 can include additional storage, in the form of computer readable storage media (e.g., removable storage 80 and/or non-removable storage 82) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, a subscriber identity module (SIM) of the mobile communications device, or any other medium which can be used to store information and which can be accessed by the network entity 48. A tangible storage medium is a medium having a tangible physical structure.

The network entity 48 also can contain communications connection(s) 88 that allow the network entity 48 to communicate with other devices, network entities, terminations, or the like. A communications connection(s) can comprise communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. The term computer readable media as used herein includes both storage media and can include communication media. The system also can have input device(s) 86 such as keyboard, mouse, pen, voice input device, touch input device, etc. Output device(s) 84 such as a display, speakers, printer, etc. also can be included.

The network entity 48 also can contain a UI portion allowing a user to communicate with the network entity 48. The UI portion is capable of rendering any information utilized in conjunction with selected restriction of wireless communications services as described above. For example, the UI portion can provide means for requesting/initiating a service, rendering text, rendering images, rendering multimedia, rendering sound, rendering video, or the like, as described above. The UI portion can provide the ability to control the network entity 48, via, for example, buttons, soft keys, voice actuated controls, a touch screen, movement of the mobile network entity 48, visual cues (e.g., moving a hand in front of a camera on the network entity 48), or the like. The UI portion can provide visual information (e.g., via a display), audio information (e.g., via speaker), mechanically (e.g., via a vibrating mechanism), or a combination thereof. In various configurations, the UI portion 40 can comprise a display, a touch screen, a keyboard, an accelerometer, a motion detector, a speaker, a microphone, a camera, a tilt sensor, or any combination thereof. The UI portion can comprise means for inputting biometric information, such as, for example, fingerprint information, retinal information, voice information, and/or facial characteristic information. As evident from the herein description, a network entity comprising portions is not to be construed as software per se.

The processor 68 and/or the wireless communications device 58 can be part of and/or in communication with various wireless communications networks. Some of which are described below.

Figure 7:
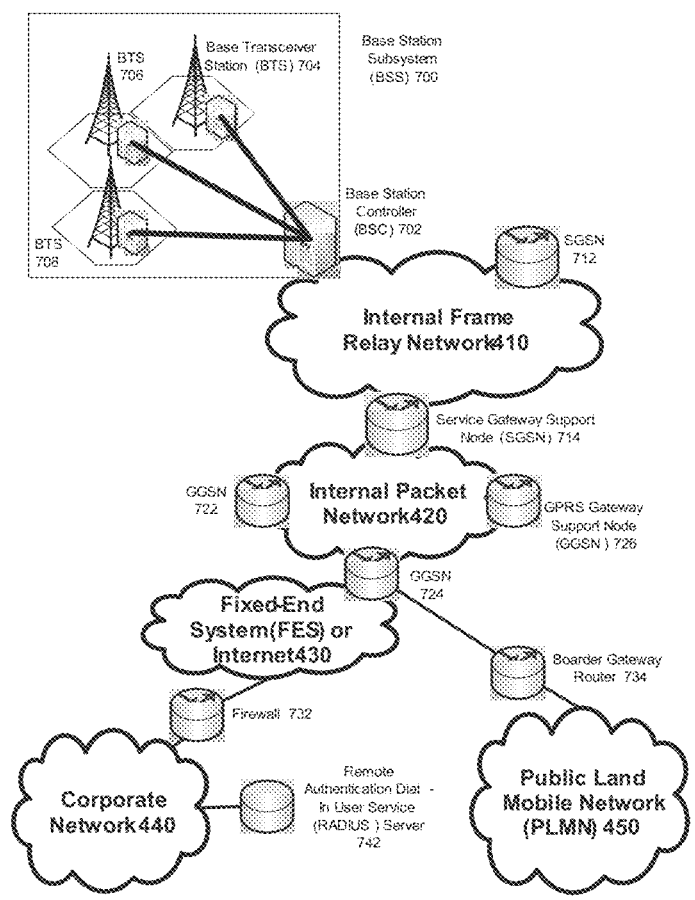
FIG. 7 depicts an overall block diagram of an exemplary packet-based mobile cellular network environment, such as a GPRS network, in which selected restrictions of wireless communications services can be implemented.

FIG. 7 depicts an overall block diagram of an exemplary packet-based mobile cellular network environment, such as a GPRS network, in which selected restriction of wireless communications services can be implemented. In the exemplary packet-based mobile cellular network environment shown in FIG. 7, there are a plurality of Base Station Subsystems ("BSS") 700 (only one is shown), each of which comprises a Base Station Controller ("BSC") 702 serving a plurality of Base Transceiver Stations ("BTS") such as BTSs 704, 706, and 708. BTSs 704, 706, 708, etc. are the access points where users of packet-based mobile devices become connected to the wireless network. In exemplary fashion, the packet traffic originating from user devices is transported via an over-the-air interface to a BTS 708, and from the BTS 708 to the BSC 702. Base station subsystems, such as BSS 700, are a part of internal frame relay network 710 that can include Service GPRS Support Nodes ("SGSN") such as SGSN 712 and 714. Each SGSN is connected to an internal packet network 720 through which a SGSN 712, 714, etc. can route data packets to and from a plurality of gateway GPRS support nodes (GGSN) 722, 724, 726, etc. As illustrated, SGSN 714 and GGSNs 722, 724, and 726 are part of internal packet network 720. Gateway GPRS serving nodes 722, 724 and 726 mainly provide an interface to external Internet Protocol ("IP") networks such as Public Land Mobile Network ("PLMN") 750, corporate intranets 740, or Fixed-End System ("FES") or the public Internet 730. As illustrated, subscriber corporate network 740 may be connected to GGSN 724 via firewall 732; and PLMN 750 is connected to GGSN 724 via boarder gateway router 734. The Remote Authentication Dial-In User Service ("RADIUS") server 742 may be used for caller authentication when a user of a mobile cellular device calls corporate network 740.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 8:
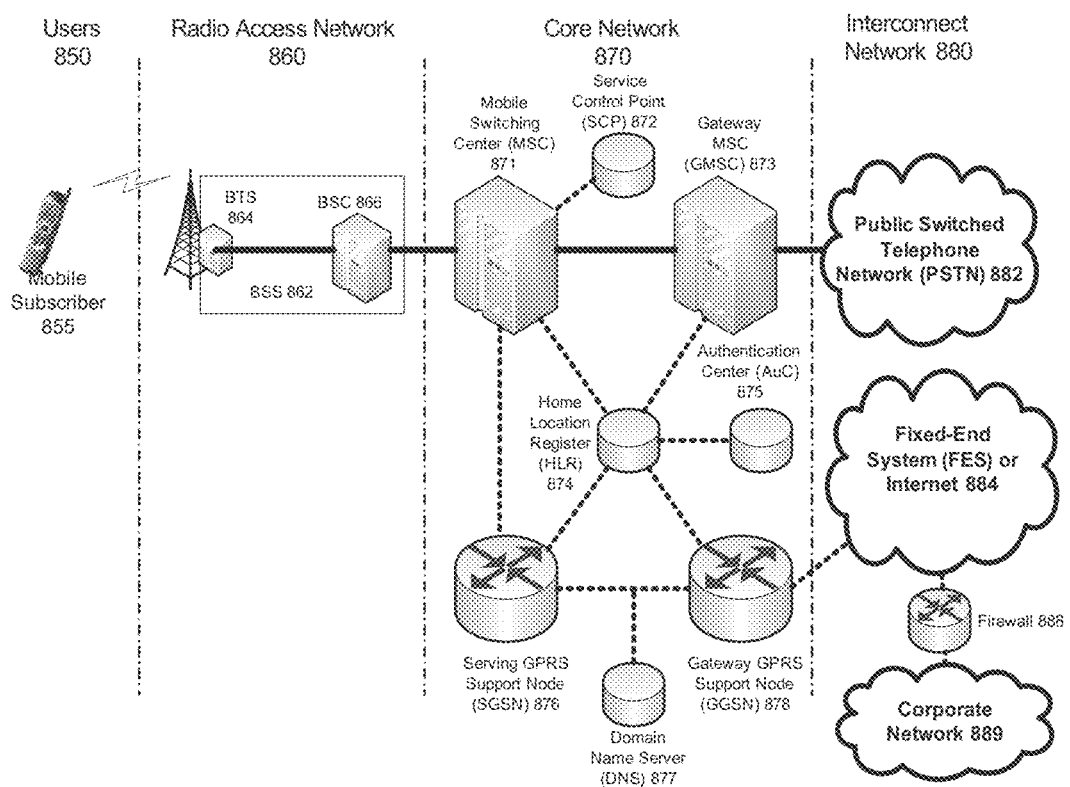
FIG. 8 illustrates an example architecture of a typical GPRS network in which selected restrictions of wireless communications services can be implemented.

FIG. 8 illustrates an architecture of a typical GPRS network in which selected restrictions of wireless communications services can be implemented. The architecture depicted in FIG. 8 is segmented into four groups: users 850, radio access network 860, core network 870, and interconnect network 880. Users 850 comprise a plurality of end users. Note, device 855 is referred to as a mobile subscriber in the description of network shown in FIG. 8. In an example embodiment, the device depicted as mobile subscriber 855 comprises a communications device (e.g., wireless communications device 58). Radio access network 860 comprises a plurality of base station subsystems such as BSSs 862, which include BTSs 864 and BSCs 866. Core network 870 comprises a host of various network elements. As illustrated in FIG. 8, core network 870 may comprise Mobile Switching Center ("MSC") 871, Service Control Point ("SCP") 872, gateway MSC 873, SGSN 876, Home Location Register ("HLR") 874, Authentication Center ("AuC") 875, Domain Name Server ("DNS") 877, and GGSN 878. Interconnect network 880 also comprises a host of various networks and other network elements. As illustrated in FIG. 8, interconnect network 880 comprises Public Switched Telephone Network ("PSTN") 882, Fixed-End System ("FES") or Internet 884, firewall 888, and Corporate Network 889.

A mobile switching center can be connected to a large number of base station controllers. At MSC 871, for instance, depending on the type of traffic, the traffic may be separated in that voice may be sent to Public Switched Telephone Network ("PSTN") 882 through Gateway MSC ("GMSC") 873, and/or data may be sent to SGSN 876, which then sends the data traffic to GGSN 878 for further forwarding.

When MSC 871 receives call traffic, for example, from BSC 866, it sends a query to a database hosted by SCP 872. The SCP 872 processes the request and issues a response to MSC 871 so that it may continue call processing as appropriate.

The HLR 874 is a centralized database for users to register to the GPRS network. HLR 874 stores static information about the subscribers such as the International Mobile Subscriber Identity ("IMSI"), subscribed services, and a key for authenticating the subscriber. HLR 874 also stores dynamic subscriber information such as the current location of the mobile subscriber. Associated with HLR 874 is AuC 875. AuC 875 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 8, when mobile subscriber 855 initiates the attach process by turning on the network capabilities of the mobile device, an attach request is sent by mobile subscriber 855 to SGSN 876. The SGSN 876 queries another SGSN, to which mobile subscriber 855 was attached before, for the identity of mobile subscriber 855. Upon receiving the identity of mobile subscriber 855 from the other SGSN, SGSN 876 requests more information from mobile subscriber 855. This information is used to authenticate mobile subscriber 855 to SGSN 876 by HLR 874. Once verified, SGSN 876 sends a location update to HLR 874 indicating the change of location to a new SGSN, in this case SGSN 876. HLR 874 notifies the old SGSN, to which mobile subscriber 855 was attached before, to cancel the location process for mobile subscriber 855. HLR 874 then notifies SGSN 876 that the location update has been performed. At this time, SGSN 876 sends an Attach Accept message to mobile subscriber 855, which in turn sends an Attach Complete message to SGSN 876.

After attaching itself with the network, mobile subscriber 855 then goes through the authentication process. In the authentication process, SGSN 876 sends the authentication information to HLR 874, which sends information back to SGSN 876 based on the user profile that was part of the user's initial setup. The SGSN 876 then sends a request for authentication and ciphering to mobile subscriber 855. The mobile subscriber 855 uses an algorithm to send the user identification (ID) and password to SGSN 876. The SGSN 876 uses the same algorithm and compares the result. If a match occurs, SGSN 876 authenticates mobile subscriber 855.

Next, the mobile subscriber 855 establishes a user session with the destination network, corporate network 889, by going through a Packet Data Protocol ("PDP") activation process. Briefly, in the process, mobile subscriber 855 requests access to the Access Point Name ("APN"), for example, UPS.com, and SGSN 876 receives the activation request from mobile subscriber 855. SGSN 876 then initiates a Domain Name Service ("DNS") query to learn which GGSN node has access to the UPS.com APN. The DNS query is sent to the DNS server within the core network 870, such as DNS 877, which is provisioned to map to one or more GGSN nodes in the core network 870. Based on the APN, the mapped GGSN 878 can access the requested corporate network 889. The SGSN 876 then sends to GGSN 878 a Create Packet Data Protocol ("PDP") Context Request message that contains necessary information. The GGSN 878 sends a Create PDP Context Response message to SGSN 876, which then sends an Activate PDP Context Accept message to mobile subscriber 855.

Once activated, data packets of the call made by mobile subscriber 855 can then go through radio access network 860, core network 870, and interconnect network 880, in a particular fixed-end system or Internet 884 and firewall 888, to reach corporate network 889.

Figure 9:
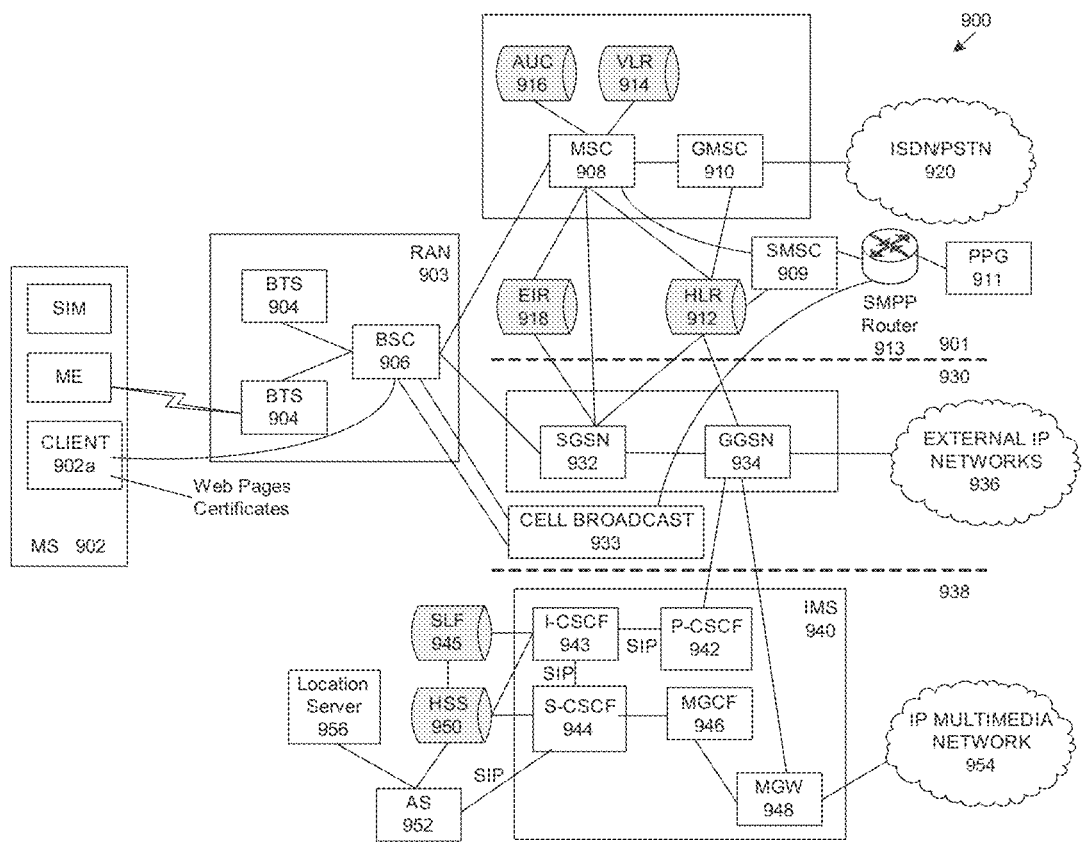
FIG. 9 illustrates an exemplary block diagram view of a GSM/GPRS/IP multimedia network architecture within which selected restrictions of wireless communications services can be implemented.

FIG. 9 illustrates an exemplary block diagram view of a GSM/GPRS/IP multimedia network architecture within which selected restrictions of wireless communications services can be implemented. As illustrated, the architecture of FIG. 9 includes a GSM core network 901, a GPRS network 930 and an IP multimedia network 938. The GSM core network 901 includes a Mobile Station (MS) 902, at least one Base Transceiver Station (BTS) 904 and a Base Station Controller (BSC) 906. The MS 902 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 904 is physical equipment, such as a radio tower, that enables a radio interface to communicate with the MS. Each BTS may serve more than one MS. The BSC 906 manages radio resources, including the BTS. The BSC may be connected to several BTSs. The BSC and BTS components, in combination, are generally referred to as a base station (BSS) or radio access network (RAN) 903.

The GSM core network 901 also includes a Mobile Switching Center (MSC) 908, a Gateway Mobile Switching Center (GMSC) 910, a Home Location Register (HLR) 912, Visitor Location Register (VLR) 914, an Authentication Center (AuC) 918, and an Equipment Identity Register (EIR) 916. The MSC 908 performs a switching function for the network. The MSC also performs other functions, such as registration, authentication, location updating, handovers, and call routing. The GMSC 910 provides a gateway between the GSM network and other networks, such as an Integrated Services Digital Network (ISDN) or Public Switched Telephone Networks (PSTNs) 920. Thus, the GMSC 910 provides interworking functionality with external networks.

The HLR 912 is a database that contains administrative information regarding each subscriber registered in a corresponding GSM network. The HLR 912 also contains the current location of each MS. The VLR 914 is a database that contains selected administrative information from the HLR 912. The VLR contains information necessary for call control and provision of subscribed services for each MS currently located in a geographical area controlled by the VLR. The HLR 912 and the VLR 914, together with the MSC 908, provide the call routing and roaming capabilities of GSM. The AuC 916 provides the parameters needed for authentication and encryption functions. Such parameters allow verification of a subscriber's identity. The EIR 918 stores security-sensitive information about the mobile equipment.

A Short Message Service Center (SMSC) 909 allows one-to-one Short Message Service (SMS) messages to be sent to/from the MS 902. A Push Proxy Gateway (PPG) 911 is used to "push" (i.e., send without a synchronous request) content to the MS 902. The PPG 911 acts as a proxy between wired and wireless networks to facilitate pushing of data to the MS 902. A Short Message Peer to Peer (SMPP) protocol router 913 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 902 sends a location update including its current location information to the MSC/VLR, via the BTS 904 and the BSC 906. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 930 is logically implemented on the GSM core network architecture by introducing two packet-switching network nodes, a serving GPRS support node (SGSN) 932, a cell broadcast and a Gateway GPRS support node (GGSN) 934. The SGSN 932 is at the same hierarchical level as the MSC 908 in the GSM network. The SGSN controls the connection between the GPRS network and the MS 902. The SGSN also keeps track of individual MS's locations and security functions and access controls.

A Cell Broadcast Center (CBC) 933 communicates cell broadcast messages that are typically delivered to multiple users in a specified area, such as a cell site or group of cell sites. Cell Broadcast is one-to-many unacknowledged geographically focused service. It enables messages to be communicated to multiple mobile phone customers who are located within a given part of its network coverage area at the time the message is broadcast.

The GGSN 934 provides a gateway between the GPRS network and a public packet network (PDN) or other IP networks 936. That is, the GGSN provides interworking functionality with external networks, and sets up a logical link to the MS through the SGSN. When packet-switched data leaves the GPRS network, it is transferred to an external TCP-IP network 936, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 930 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 938 was introduced with 3GPP Release 5, and includes an IP multimedia subsystem (IMS) 940 to provide rich multimedia services to end users. A representative set of the network entities within the IMS 940 are a call/session control function (CSCF), a media gateway control function (MGCF) 946, a media gateway (MGW) 948, and a master subscriber database, called a home subscriber server (HSS) 950. The HSS 950 may be common to the GSM network 901, the GPRS network 930 as well as the IP multimedia network 938.

The IP multimedia system 940 is built around the call/session control function, of which there are three types: an interrogating CSCF (I-CSCF) 943, a proxy CSCF (P-CSCF) 942, and a serving CSCF (S-CSCF) 944. The P-CSCF 942 is the MS's first point of contact with the IMS 940. The P-CSCF 942 forwards session initiation protocol (SIP) messages received from the MS to an SIP server in a home network (and vice versa) of the MS. The P-CSCF 942 may also modify an outgoing request according to a set of rules defined by the network operator (for example, address analysis and potential modification).

The I-CSCF 943, forms an entrance to a home network and hides the inner topology of the home network from other networks and provides flexibility for selecting an S-CSCF. The I-CSCF 943 may contact a subscriber location function (SLF) 945 to determine which HSS 950 to use for the particular subscriber, if multiple HSS's 950 are present. The S-CSCF 944 performs the session control services for the MS 902. This includes routing originating sessions to external networks and routing terminating sessions to visited networks. The S-CSCF 944 also decides whether an application server (AS) 952 is required to receive information on an incoming SIP session request to ensure appropriate service handling. This decision is based on information received from the HSS 950 (or other sources, such as an application server 952). The AS 952 also communicates to a location server 956 (e.g., a Gateway Mobile Location Center (GMLC)) that provides a position (e.g., latitude/longitude coordinates) of the MS 902.

The HSS 950 contains a subscriber profile and keeps track of which core network node is currently handling the subscriber. It also supports subscriber authentication and authorization functions (AAA). In networks with more than one HSS 950, a subscriber location function provides information on the HSS 950 that contains the profile of a given subscriber.

The MGCF 946 provides interworking functionality between SIP session control signaling from the IMS 940 and ISUP/BICC call control signaling from the external GSTN networks (not shown). It also controls the media gateway (MGW) 948 that provides user-plane interworking functionality (e.g., converting between AMR- and PCM-coded voice). The MGW 948 also communicates with other IP multimedia networks 954.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of selected restriction of wireless communications services have been described in connection with various computing devices/processor, the underlying concepts can be applied to any computing device, processor, or system capable of determining propagation time. The various techniques described herein can be implemented in connection with hardware or software or, where appropriate, with a combination of both. Thus, the methods and apparatuses for selected restriction of wireless communications services can be implemented, or certain aspects or portions thereof, can take the form of program code (i.e., instructions) embodied in tangible storage media having a tangible physical structure, such as floppy diskettes, CD-ROMs, hard drives, or any other machine-readable storage medium (computer-readable storage medium), wherein, when the program code is loaded into and executed by a machine, such as a computer, the machine becomes an apparatus for determining propagation time. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for selected restriction of wireless communications services also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for selected restriction of wireless communications services. When implemented on a general-purpose processor, the program code combines with the processor to provide a unique apparatus that operates to invoke the functionality of selected restriction of wireless communications services. Additionally, any storage techniques used in connection with selected restriction of wireless communications services can invariably be a combination of hardware and software.

While selected restriction of wireless communications services have been described in connection with the various embodiments of the various figures, it is to be understood that other similar embodiments can be used or modifications and additions can be made to the described embodiment for selected restriction of wireless communications services without deviating therefrom. For example, one skilled in the art will recognize that selected restriction of wireless communications services as described in the present application may apply to any environment, whether wired or wireless, and may be applied to any number of devices connected via a communications network and interacting across the network. Therefore, selected restriction of wireless communications services should not be limited to any single embodiment, but rather should be construed in breadth and scope in accordance with the appended claims.

What is claimed:

1. A method comprising:
   determining whether a wireless communication device is located within a zone of coverage comprising a moving, dynamically defined region that is defined by an affected area of an event;
   determining, a permissibility of a service for the wireless communication device based at least on a time, wherein types of the permissibility comprise a first permissibility and a second permissibility; and
   controlling the service for the wireless communication device while the wireless communication device is within the zone of coverage based on the permissibility,
   wherein the first permissibility allows limited provision of the service for the wireless communication device; and
   wherein the second permissibility restricts the service for the wireless communication device, wherein the service comprises a multimedia service, and the controlling comprises allowing limited reception of the multimedia service.

2. The method of claim 1, wherein the zone of coverage is further defined by at least one of a cell, a micro cell, a pico cell, a Femto cell, or a wireless access point.

3. The method of claim 1, wherein the zone of coverage comprises a geographic boundary.

4. The method of claim 1, wherein the zone of coverage comprises a three-dimensional boundary.

5. The method of claim 1, wherein the event comprises an emergency.

6. A method comprising:
   determining whether a wireless communication device is located within a zone of coverage comprising a moving, dynamically defined region that is defined by an affected area of an event;
   determining a permissibility of a service for the wireless communication device based at least on a time, wherein types of the permissibility comprise a first permissibility and a second permissibility;
   controlling the service for the wireless communication device while the wireless communication device is within the zone of coverage based on the permissibility,
   wherein the first permissibility allows limited provision of the service for the wireless communication device, and
   wherein the second permissibility denies the service for the wireless communication device, wherein the service comprises a multimedia service, and the controlling comprises limiting provision of the multimedia service.

7. The method of claim 6, wherein the zone of coverage is further defined by at least one of a cell, a micro cell, a pico cell, a Femto cell, or a wireless access point.

8. The method of claim 6, wherein the zone of coverage comprises a geographic boundary.

9. The method of claim 6, wherein the zone of coverage comprises a three-dimensional boundary.

10. The method of claim 6, wherein the permissibility is further based on an identity of the wireless communication device.

11. The method of claim 6, wherein the types of permissibility further comprise a third permissibility, wherein the third permissibility does not restrict the service for the wireless communication device.

12. The method of claim 6, wherein the event comprises an emergency.

13. A method comprising:
   determining whether a location of a wireless communication device is within a zone of coverage comprising a moving, dynamically defined region that is defined by an affected area of an event;
   determining a permissibility of a service for the wireless communication device based at least on a time; and
   controlling a provision of the service to the wireless communication device based on the permissibility, wherein the service comprises an internet protocol multimedia service, and the controlling comprises allowing limited provision of the internet protocol multimedia service.

14. The method of claim 13, wherein controlling the provision of the service comprises:
   based on at least the permissibility being a first permissibility, allowing the service for the wireless communication device while within the zone of coverage.

15. The method of claim 13, wherein controlling the provision of the service comprises:
   based on at least the permissibility being a second permissibility, restricting the service for the wireless communication device while within the zone of coverage.

16. The method of claim 13, wherein controlling the provision of the service comprises:
   based on at least the permissibility being a third permissibility, denying the service for the wireless communication device while within the zone of coverage.

17. The method of claim 13, wherein the permissibility is further based on an identity of the wireless communication device.

18. The method of claim 13, wherein the event comprises an emergency.

* * * * *